(12) United States Patent
Garces et al.

(10) Patent No.: US 12,029,348 B2
(45) Date of Patent: Jul. 9, 2024

(54) ADJUSTABLE GRATE ASSEMBLY FOR A WOOD BURNING GRILL

(71) Applicant: Haier US Appliance Solutions, Inc., Wilmington, DE (US)

(72) Inventors: Tomas Garces, Louisville, KY (US); Gonzalo Luis Ocano, Louisville, KY (US); Daniel Carballo, Louisville, KY (US); Eric Matthew Lewis, Louisville, KY (US); Andrew Schiller, Louisville, KY (US); Steven Fox, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 816 days.

(21) Appl. No.: 17/113,752

(22) Filed: Dec. 7, 2020

(65) Prior Publication Data

US 2022/0175187 A1    Jun. 9, 2022

(51) Int. Cl.
*A47J 37/07* (2006.01)
*F24B 1/26* (2006.01)
*F24B 13/02* (2006.01)

(52) U.S. Cl.
CPC ....... *A47J 37/0786* (2013.01); *A47J 37/0704* (2013.01); *A47J 37/0759* (2013.01); *F24B 1/26* (2013.01); *F24B 13/02* (2013.01); *A47J 2037/0795* (2013.01)

(58) Field of Classification Search
CPC .............. A47J 37/0786; A47J 37/0704; A47J 37/0759; A47J 2037/0795; F24B 1/26; F24B 13/02

USPC .......................................................... 99/448
See application file for complete search history.

(56) References Cited

U.S. PATENT DOCUMENTS

| | | | |
|---|---|---|---|
| 4,503,782 A * | 3/1985 | Helton | G01G 19/52 110/101 CC |
| 5,458,053 A | 10/1995 | Hsiao | |
| 5,660,101 A * | 8/1997 | Cirigliano | A47J 37/0731 126/25 AA |
| 5,884,554 A * | 3/1999 | Sprick | A47J 37/041 99/449 |
| 9,277,840 B2 | 3/2016 | Ikeda | |
| 10,709,293 B1 * | 7/2020 | Nathans | C08J 11/14 |

(Continued)

FOREIGN PATENT DOCUMENTS

DE    202018106754 U1    2/2019

*Primary Examiner* — Omar Flores Sanchez
(74) *Attorney, Agent, or Firm* — Dority & Manning, P.A.

(57) ABSTRACT

A wood burning grill includes a cabinet that defines a coal support platform for supporting burning wood during a grilling process. A grate is positioned above the coal support platform and a grate positioning assembly mechanically couples the grate to the cabinet. The grate positioning assembly includes two four-bar linkage systems positioned on opposite sides of the grate for suspending the grate in cantilevered manner from the cabinet. Each four-bar linkage system includes a drive arm that is mechanically coupled to the drive gear and a support arm that maintains the grate in a substantially horizontal orientation while moving between the raised position and the lowered position. A hand wheel is rotatably mounted to the cabinet and is coupled to the drive gear through a rotating shaft and a worm gear such that rotating the hand wheel moves the grate between the raised position and the lowered position.

20 Claims, 6 Drawing Sheets

(56) References Cited

U.S. PATENT DOCUMENTS

| | | | |
|---|---|---|---|
| 11,759,052 B2* | 9/2023 | Carballo | F16H 37/12 |
| | | | 126/25 R |
| 2004/0112226 A1* | 6/2004 | Johnston | A47J 37/0704 |
| | | | 99/450 |
| 2004/0154608 A1* | 8/2004 | Ward | A47J 37/0786 |
| | | | 126/41 R |
| 2008/0083401 A1* | 4/2008 | Cusack | A47J 37/0786 |
| | | | 126/25 R |
| 2012/0288596 A1* | 11/2012 | Holdo Baggott | A23L 5/15 |
| | | | 426/235 |
| 2014/0224240 A1* | 8/2014 | Chung | A47J 37/0704 |
| | | | 126/25 R |
| 2014/0261377 A1* | 9/2014 | Chung | A47J 45/085 |
| | | | 126/25 R |
| 2015/0164275 A1* | 6/2015 | Molnar | A47J 37/0807 |
| | | | 426/523 |
| 2016/0360925 A1 | 12/2016 | Chun | |
| 2019/0231144 A1 | 8/2019 | Cook | |
| 2022/0090790 A1* | 3/2022 | Hamilton | F23K 3/14 |
| 2022/0248904 A1* | 8/2022 | Carballo | A47J 37/0786 |
| 2023/0204218 A1* | 6/2023 | Thibault | A47J 37/0704 |
| | | | 126/9 B |

* cited by examiner

ADJUSTABLE GRATE ASSEMBLY FOR A WOOD BURNING GRILL

FIELD OF THE INVENTION

The present subject matter relates generally to wood burning grills, and more particularly to grilling rack systems for wood burning grills.

BACKGROUND OF THE INVENTION

Grilling is a form of cooking where meat, vegetables, or other food items are placed in close proximity to a burning, combustible material, such as wood or charcoal, to facilitate a cooking process. Conventional grills include an enclosed base or bottom pan that receives charcoal and that supports a cooking grate for receiving the food items to be cooked. However, conventional grills include a cooking grate that has a fixed vertical position or grates that may only be moved between fixed locations when the grill is cold. As a result, food items being cooked may often be positioned too close or too far from the bed of coals or burning wood, resulting in overcooking or undercooking, respectively.

In addition, once the wood or charcoal is completely consumed in a conventional grill, it is typically very difficult to remove the hot grate and food items to add more wood or charcoal. As a result, conventional grills must typically be loaded with enough wood or charcoal at the beginning of a cooking process to complete the entire cooking process before being consumed. Certain conventional wood burning grills may include mechanisms for adding more wood fuel to the grill during a cooking process, e.g., through a grate opening or access door. However, because the grates of the grill are typically fixed in vertical position, the new wood or charcoal may necessarily be placed closer to food items on the grate and may burn hotter or put off undesirable volatile organic compounds (VOCs) upon initial ignition. As a result, food items being grilled when new wood or charcoal is added may be burned due to close proximity with the flame or may have an acrid taste due to the additional VOCs or other wood byproducts of the burning wood.

Accordingly, an improved wood burning grill is desired. More specifically, a wood burning grill with a system for adjusting a grate position to regulate the proximity of the food to a coal bed, to permit reloading of the grill with hot charcoal or wood fuel, and to improve the overall cooking process would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a wood burning grill defining a vertical direction, a lateral direction, and a transverse direction is provided. The wood burning grill includes a cabinet defining a coal support platform for supporting burning wood during a grilling process, a grate positioned above the coal support platform along the vertical direction and defining a cooking surface for receiving food items, and a grate positioning assembly mechanically coupling the grate to the cabinet. The grate positioning assembly includes a linkage arm system mechanically coupling the grate to the cabinet and a drive gear mechanically coupled to the linkage arm system and being rotatable to move the grate between a raised position and a lowered position.

In another exemplary embodiment, a grate positioning assembly for a wood burning grill is provided. The wood burning grill includes a cabinet defining a coal support platform and a grate positioned above the coal support platform. The grate positioning assembly includes a drive arm that is rotatably coupled to the cabinet and the grate, a drive gear that is mechanically coupled to the drive arm such that rotating the drive gear rotates the drive arm to move the grate between a raised position and a lowered position, and a support arm that is rotatably mounted to the cabinet and the grate for maintaining the grate in a substantially horizontal orientation while moving between the raised position and the lowered position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. The terms "includes" and "including" are intended to be inclusive in a manner similar to the term "comprising." Similarly, the term "or" is generally intended to be inclusive (i.e., "A or B" is intended to mean "A or B or both").

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

Figure 1:
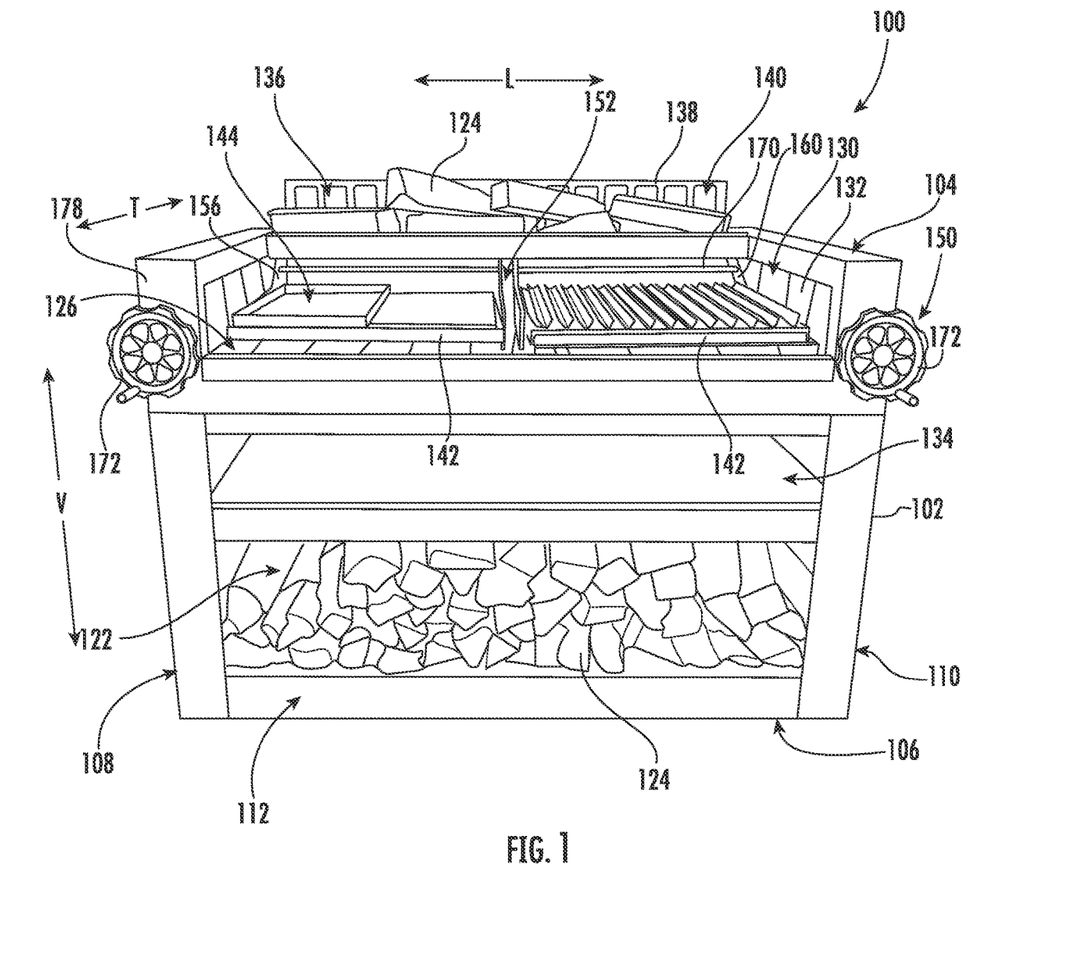
FIG. 1 provides a front perspective view of a wood burning grill according to an exemplary embodiment of the present subject matter.
Figure 2:
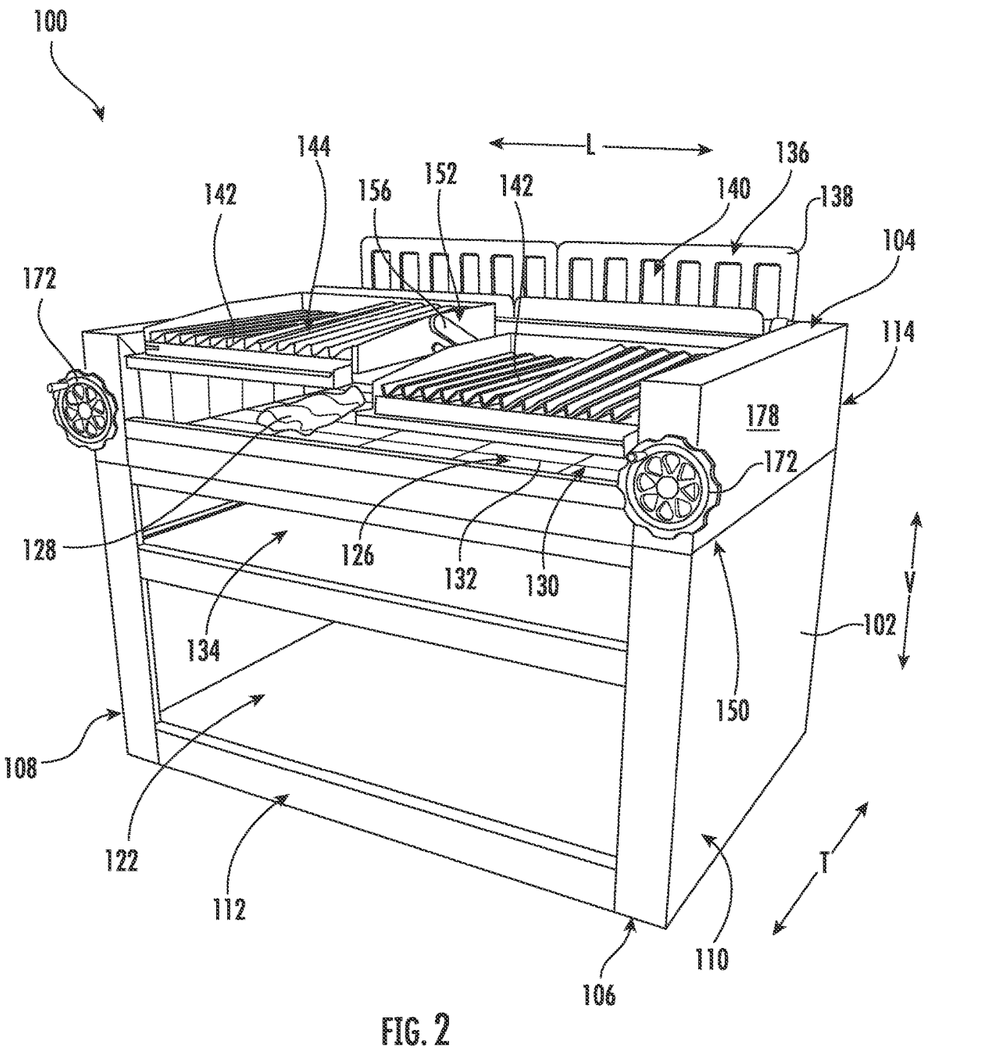
FIG. 2 provides a perspective view of the exemplary wood burning grill of FIG. 1 according to example embodiments of the present subject matter.
Figure 3:
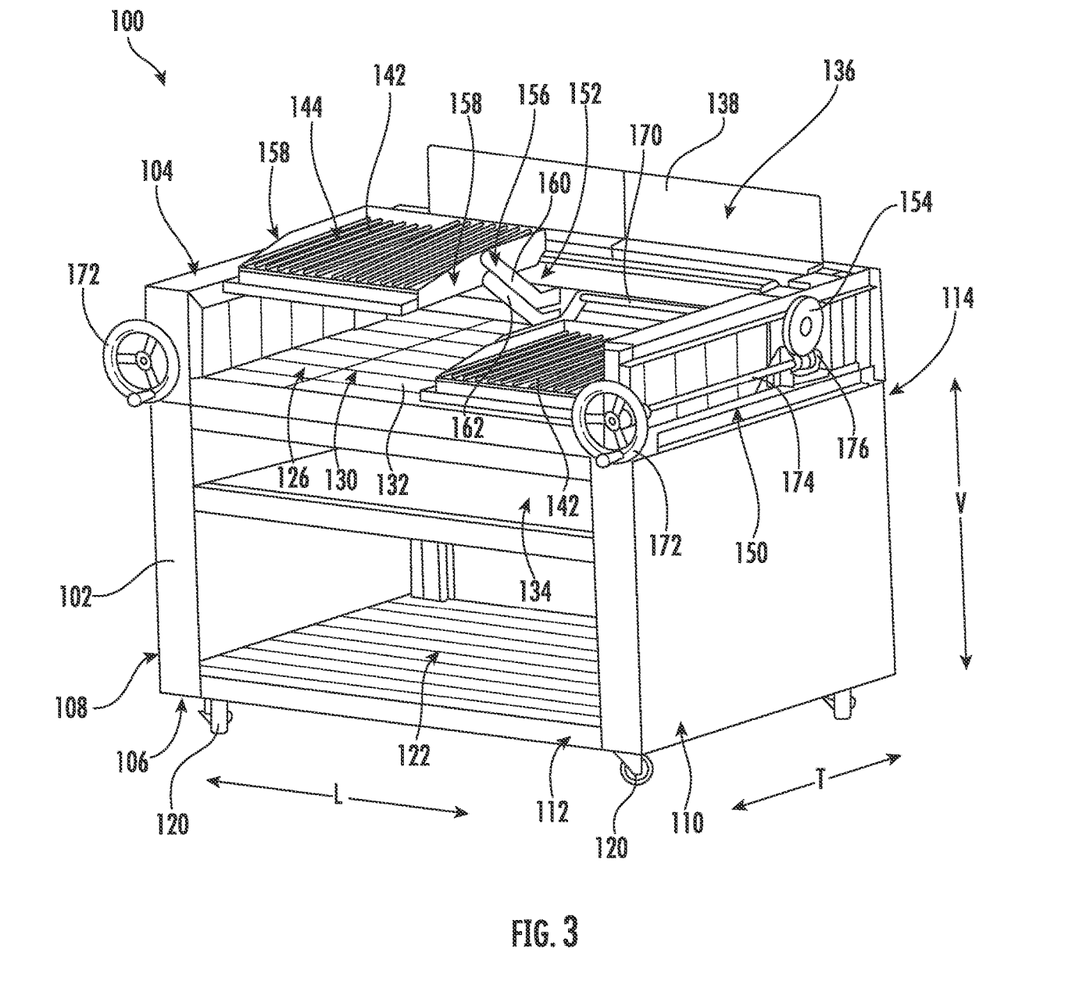
FIG. 3 provides a perspective view of the exemplary wood burning grill of FIG. 1 according to example embodiments of the present subject matter with a cover panel removed to reveal components of a grate positioning assembly.

Turning to the figures, FIGS. 1 through 3 provide various perspective views of a wood burning grill 100 according to exemplary embodiments of the present disclosure. Wood burning grill 100 generally defines a vertical direction V, a lateral direction L, and a transverse direction T, each of which is mutually perpendicular, such that an orthogonal coordinate system is generally defined. Wood burning grill 100 can include a chassis or cabinet 102 that extends along the vertical direction V between a top portion 104 and a bottom portion 106, along the lateral direction L between a left side portion 108 and a right side portion 110, and along the traverse direction T between a front portion 112 and a rear portion 114.

Cabinet 102 may be positioned on casters or wheels 120 (FIG. 3), e.g., to facilitate easy movement of wood burning grill 100. In addition, cabinet 102 of wood burning grill 100 may define one or more lower storage compartments 122. Storage compartment 122 may be used for storing cooking utensils, pots, pans, grill tools, or any other suitable items. According to the illustrated embodiment, storage compartment 122 may be used to store wood 124, such as wood logs or wood chunks, that may be periodically added to the firebox (described below) to facilitate the grilling process. Although the present disclosure illustrates and describes the use of wood logs 124 for burning to facilitate a cooking process, it should be appreciated that any other suitable type or size of combustible material may be used. For example, wood chunks, wood chips, wood pellets, or any other suitable material may be used.

As illustrated, cabinet 102 may further define a coal support platform 126 that is positioned proximate top 104 of cabinet 102. As will be described in more detail below, coal support platform 126 is generally configured for supporting charcoal, wood embers, or other wood fuel (identified herein generally as charcoal or coals 128, see FIGS. 2 and 6) for facilitating a cooking process. As used herein, the terms "charcoal," "coals," and the like are generally intended to refer to any combustible source or byproduct that is intended to facilitate cooking of one or more items. For example, according to an exemplary embodiment, coals 128 refer to the wood and/or wood byproducts that burn off from or separate from one or more burning logs (e.g., wood 124), such as embers or other heated or burning wood products. Notably, the coals 128 may burn cleaner than the wood logs, as volatile organic carbons (VOCs) have mostly burned away from the wood logs 124.

According to the illustrated embodiment, coal support platform 126 may be positioned at a top of cabinet 102 and may be defined by or covered by an insulative material 130. For example, according to the illustrated embodiment, the insulative material 130 is fire brick 132. Specifically, fire brick 132 is positioned on top 104 of cabinet 102 to define a flat surface (e.g., coal support platform 126) for supporting coals 128. In addition, according to the illustrated embodiment, coal support platform 126 is slightly recessed from top 104 of cabinet 102, and the sides (e.g., left side 108 and right side 110) and back (e.g., rear 114) may be raised to partially define a coal chamber that retains heat, blocks wind, etc.

As used herein, the term insulative material, fire brick, or the like is generally intended to refer to any material that is suitably rigid and capable of withstanding high temperature from burning coals. In this regard, for example, the fire brick may be one or more blocks of ceramic material positioned adjacent to each other to form the coal bed. These fire bricks are capable of withstanding very high temperatures and may also be insulative or have a relatively low thermal conductivity, such that thermal energy from the coals 128 is not wasted through the fire brick 132 and is instead focused on the food items being cooked.

According to the illustrated embodiment, cabinet 102 may further define a secondary storage compartment, which may also be used as a warming compartment 134. In this regard, warming compartment 134 is an open compartment defined in cabinet 102 that is positioned between storage compartment 122 and coal support platform 126. Notably, residual heat from coals 128 may heat warming compartment 134. According to exemplary embodiments of the present subject matter, warming compartment 134 may also be surrounded or defined by fire brick 132, such that cooked food may be positioned within warming compartment 134 keep it warm while the remainder of the cooking is being completed.

Figure 4:
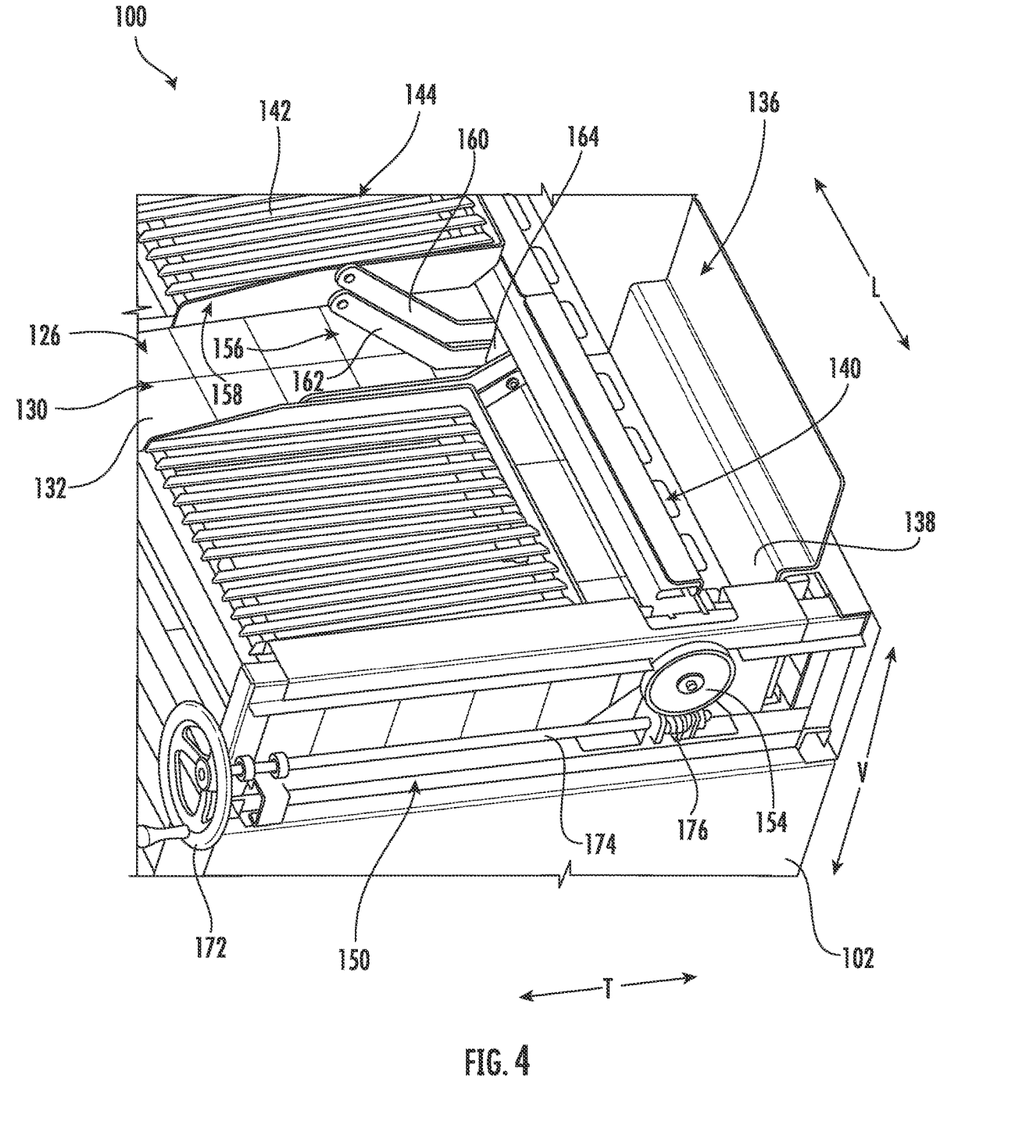
FIG. 4 provides a perspective view of the exemplary grate positioning assembly of FIG. 3 according to example embodiments of the present subject matter.

As best shown in FIG. 4, wood burning grill 100 may further include a firebox 136 positioned adjacent coal support platform 126. In general, firebox 136 is configured for receiving wood 124 that is ignited and burned to form coals 128. More specifically, according to the illustrated embodiment, firebox 136 comprises a support grate 138 that is bent to form a trough for receiving wood 124. In addition, support grate 138 may include one or more apertures 140 for permitting coals 128 to burn off of wood 124 and fall onto coal support platform 126. Once coals 128 are on coal support platform 126, they may be moved forward and spread out (e.g., with a coal rake or other tool) to facilitate a cooking process.

As illustrated, wood burning grill 100 may further include one or more cooking grates 142 that are positioned above coal support platform 126 along the vertical direction V and which define a cooking surface 144 for supporting food items (not shown) during a cooking or grilling process. Notably, as explained briefly above, the vertical position of the grate 142 relative to the coals 128 may be important in determining how a food item is cooked. In this regard, if grate 142 is too close to coals 128, the food items may burn or cook too quickly. By contrast, if the grate 142 is too far away from coals 128, food items may remain undercooked or cook to slowly. As result, aspects of the present subject matter are directed to a system for adjusting a vertical position of the grate 142 relative to the coal support platform 126.

Specifically, referring now also to FIGS. 4 through 7, wood burning grill may include a grate positioning assembly 150 that mechanically couples grate 140 to cabinet 102 or another structure of wood burning grill 100 and is generally configured for moving grate 140 between a raised position (e.g., as shown in FIG. 3, left side) and a lowered position (e.g., as shown in FIG. 3, right side). Specifically, grate positioning assembly 150 may be configured for moving grate 142 to any suitable position between the raised and lowered position, which may be vertical movement in the range of 6 inches, 12 inches, 24 inches, or greater. Although an exemplary grate positioning system 150 is described below to facilitate explanation of aspects of the present subject matter, it should be appreciated that the scope of the present disclosure is not limited to the embodiment described. Indeed, variations and modifications may be made to grate positioning assembly 150 while remaining within the scope of the present subject matter.

In general, grate positioning assembly 150 generally includes a linkage arm system 152 that mechanically couples grate 142 to the cabinet 102. In addition, a drive gear 154 may be operably coupled to linkage arm system 152 and may be rotatable to move grate 142 between the raised position and the lowered position. It should be appreciated that according to exemplary embodiments, any suitable linkage arm system that mechanically couples grate 142 to cabinet 102 may be used. However, according to the illustrated embodiment, linkage arm system 152 includes one or more four-bar linkages 156. More specifically, a system of four-bar linkages 156 are used to support each grate 142. In this regard, the illustrated embodiment includes two grates 142 position laterally side-by-side, with four total four-bar linkages 156 supporting the grates 142. In this regard, each grate 142 may be supported on each of its sides 158 by a four-bar linkage 156. An exemplary four-bar linkage 156 will be described below, but variations and modifications may be made to four-bar linkage 156 while remaining within scope the present subject matter.

Specifically, as illustrated, four-bar linkage 156 includes a drive arm 160 that is mechanically coupled to drive gear 154 such that drive arm 160 rotates with drive gear 154. In addition, four-bar linkage 156 includes a support arm 162 that is rotatably mounted to cabinet 102 and grate 142 for maintaining the grate 142 in a substantially horizontal orientation (e.g., as defined by the lateral direction L and the transverse direction T) while grate 142 is moving between the raised position and the lowered position. Thus, as illustrated, the "four bars" of the four-bar linkage 156 may include drive arm 160, support arm 162, the section of grate that extends between the pivot points where drive arm 160 and support 162 engage grates 142, and the section of cabinet 102 or some other support structure coupled to cabinet 102 that extends between the opposite ends of drive arm 160 and support arm 162.

According to the illustrated embodiment, in order to facilitate independent movement of the two grates 142, grate positioning assembly 150 may include a central support 164 that is mounted to a rear 114 of cabinet 102 at a center point along the lateral direction L. Central support 164 may be configured for rotatably supporting drive arms 160 and support arms 162 of the two innermost four-bar linkages 156. Notably, all drive arms 160 and support arms 162 are illustrated as being mounted proximate rear 114 of cabinet 102, such that grates 142 are cantilevered over coal support platform 126. Notably, such positioning facilitates easy coal management below grates 142.

Figure 5:
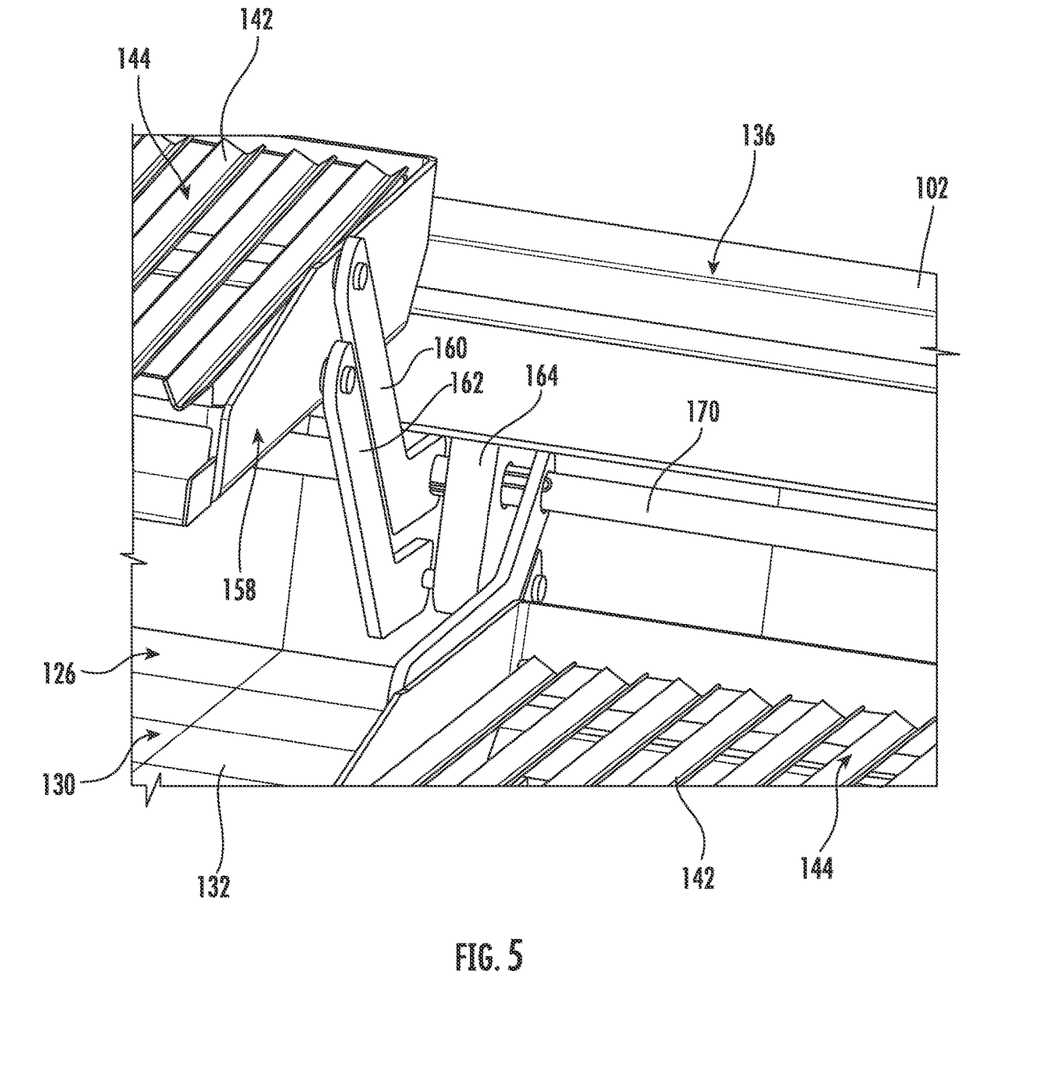
FIG. 5 provides a perspective view of the exemplary grate positioning assembly of FIG. 3 according to example embodiments of the present subject matter.
Figure 6:
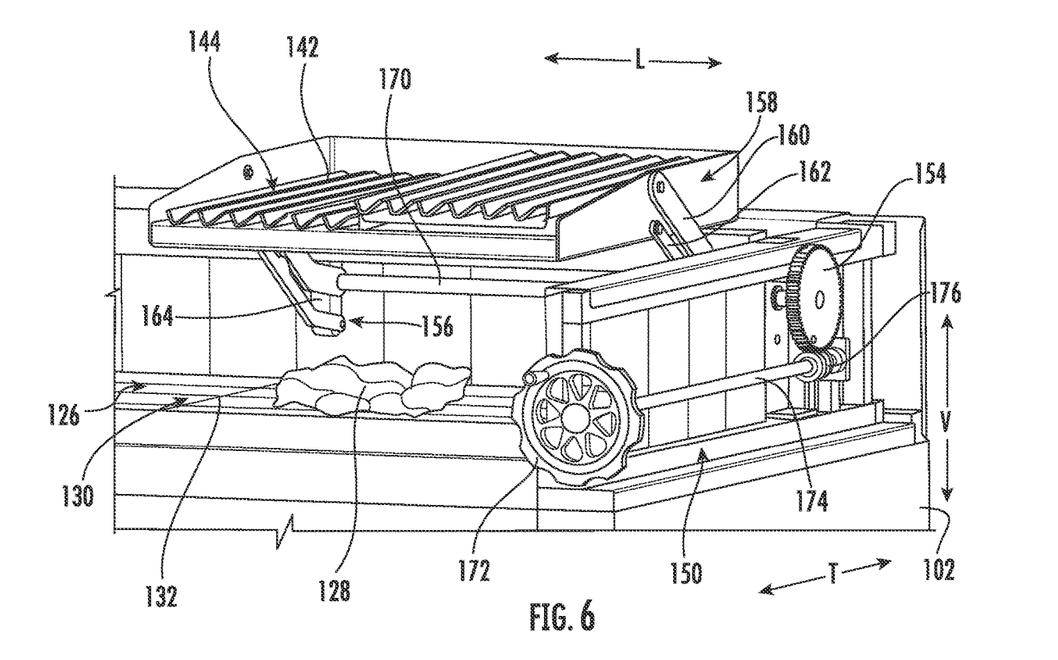
FIG. 6 provides a perspective view of the exemplary grate positioning assembly of FIG. 3 according to example embodiments of the present subject matter.
Figure 7:
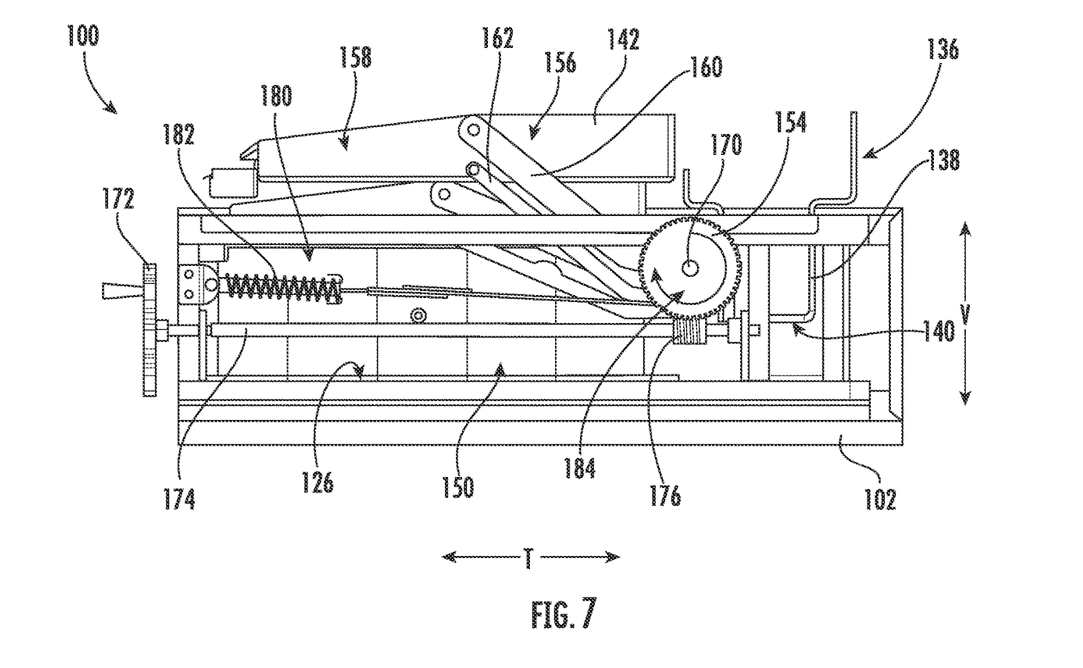
FIG. 7 provides a side view of the exemplary grate positioning assembly of FIG. 3 according to example embodiments of the present subject matter.

As best shown in FIGS. 5 and 6, drive gear 154 may be coupled to drive arms 160 of four-bar linkages 156 using a drive rod 170 that extends substantially along the lateral direction L to rotatably couple drive arms 160 of each four-bar linkage 156 supporting a single grate 142. In this manner, four-bar linkages 156 on each side of a grate 142 may rotate in unison, e.g., to maintain a horizontal orientation of grates 142. In this regard, drive gear 154 may be rotatably mounted to cabinet 102 such that it rotates about the lateral direction L and is directly coupled to drive rod 170. Thus, when viewed as shown in FIG. 7, rotating drive gear 154 in the clockwise direction will raise grate 142, thereby increasing the distance between coal support platform 126 and cooking surface 144. By contrast, rotating drive gear 154 in the counterclockwise direction will lower grates 142, thereby decreasing the distance between coal support platform 126 and cooking surface 144.

Notably, drive gear 154 is positioned proximate rear 114 of cabinet 102. As a result, it may be desirable to provide easier access or control to drive gear 154 by a user standing at a front 112 of wood burning grill 100. According to exemplary embodiments of the present subject matter, grate positioning assembly 150 further includes a hand wheel 172 that is rotatably mounted to front 112 of cabinet 102. Hand wheel 172 may be coupled to drive gear 154 by a rotating shaft 174 and a worm gear 176. As shown, hand wheel 172 and rotating shaft 174 may generally be aligned with and rotate about the transverse direction T. More specifically, rotating shaft 174 may extend between hand wheel 172 and drive gear 154, while worm gear 176 may mechanically couple rotating shaft 174 to drive gear 154 such that rotating hand wheel 172 rotates drive gear 154 to raise and lower grates 142. Notably, worm gear 176 may generally be configured as a self-locking gear such that worm gear 176 and drive gear 154 only rotate when hand wheel 172 initiates such rotation. Thus, when a user removes their hand from hand wheel 172, grate 142 may remain in a fixed vertical position. It should be appreciated that cabinet 102 may include a cover 178 that is generally positionable over the working components of grate positioning assembly 150, e.g., as shown in position in FIG. 2 (and removed in FIG. 3). In this manner, when cover 178 is positioned on cabinet 102, grate positioning assembly 150 may be concealed with the exception of hand wheel 172.

According to an exemplary embodiment, grate positioning assembly 150 may further include features for easing the mechanical force required to raise grate 142. In this regard, for example, grate positioning assembly 150 may include a resilient element 180 that is mechanically coupled to drive gear 154 and is configured to bias drive gear 154 toward the raised position (e.g., by urging drive gear 154 to rotate in the clockwise direction as shown in FIG. 7). More specifically, according to the illustrated embodiment, resilient element 180 is a mechanical spring 182 that extends substantially along the transverse direction T from front 112 of cabinet 102 to a lower side 184 of drive gear 154. It should be appreciated that other orientations of resilient element 180 are possible and within the scope of the present subject matter. For example, resilient element 180 may be a torsional spring positioned around drive gear 154 or drive rod 170, a mechanical spring extending between a top portion of drive gear 154 and a rear 114 of cabinet 102, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wood burning grill defining a vertical direction, a lateral direction, and a transverse direction, the wood burning grill comprising:
   a cabinet defining a coal support platform for supporting burning wood during a grilling process;
   a grate positioned above the coal support platform along the vertical direction and defining a cooking surface for receiving food items; and
   a grate positioning assembly mechanically coupling the grate to the cabinet, the grate positioning assembly comprising:
      a linkage arm system mechanically coupling the grate to the cabinet;
      a drive gear mechanically coupled to the linkage arm system and being rotatable to move the grate between a raised position and a lowered position; and
      a resilient element mechanically coupled to the drive gear and being configured to bias the drive gear toward the raised position.

2. The wood burning grill of claim 1, wherein the linkage arm system comprises:
   a drive arm that is mechanically coupled to the drive gear such that the drive arm rotates with the drive gear; and
   a support arm that is rotatably mounted to the cabinet and the grate for maintaining the grate in a substantially horizontal orientation while moving between the raised position and the lowered position.

3. The wood burning grill of claim 2, wherein the grate, the drive arm, the support arm, and the cabinet define a first four-bar linkage for supporting a first side of the grate, the wood burning grill further comprising:
   a second four-bar linkage spaced apart from the first four-bar linkage along the lateral direction for supporting a second side of the grate.

4. The wood burning grill of claim 3, wherein the grate positioning assembly further comprises:
   a drive rod that extends along the lateral direction to rotatably couple the drive arm of the first four-bar linkage and the drive arm of the second four-bar linkage.

5. The wood burning grill of claim 4, wherein the drive gear is directly coupled to the drive rod and is rotatable about the lateral direction.

6. The wood burning grill of claim 2, wherein the drive arm and the support arm are both rotatably mounted to the cabinet proximate a rear portion of the cabinet such that the grate is cantilevered over the coal support platform.

7. The wood burning grill of claim 1, wherein the grate is a first grate and the grate positioning system is a first grate positioning system, the wood burning grill further comprising:
   a second grate positioned above the coal support platform along the vertical direction; and
   a second grate positioning assembly mechanically coupling the second grate to the cabinet and being configured to move the second grate between a raised position and a lowered position.

8. The wood burning grill of claim 7, wherein the grate positioning assembly further comprises:
   a central support mounted to the cabinet for rotatably supporting a drive arm and a support arm of each of the first grate positioning system and the second grate positioning system.

9. The wood burning grill of claim 1, wherein the grate positioning assembly further comprises:
   a hand wheel that is rotatably mounted to the cabinet;
   a rotating shaft that extends between the hand wheel and the drive gear; and
   a worm gear that mechanically couples the rotating shaft to the drive gear such that rotating the hand wheel rotates the drive gear to raise and lower the grate.

10. The wood burning grill of claim 9, wherein the worm gear is configured to be self-locking such that the worm gear and drive gear only rotate when the hand wheel is rotated.

11. The wood burning grill of claim 9, wherein the cabinet comprises a cover for concealing the grate positioning assembly such that only the hand wheel is exposed.

12. The wood burning grill of claim 1, wherein the resilient element comprises a mechanical spring that extends between a front portion of the cabinet to a lower side of the drive gear.

13. The wood burning grill of claim 1, further comprising:
   a firebox positioned adjacent the coal support platform, the firebox being configured for receiving wood for burning to form cooking coals.

14. The wood burning grill of claim 13, wherein the wood fuel comprises wood chunks or wood logs and the cooking coals are embers formed by burning the wood chunks or the wood logs.

15. The wood burning grill of claim 13, wherein the firebox comprises a support grate defining a trough have a plurality of apertures to permit the cooking coals to fall from the firebox onto the coal support platform.

16. The wood burning grill of claim 1, wherein a layer of insulative material is positioned on a top of the cabinet to define the coal support platform.

17. The wood burning grill of claim 16, wherein the layer of insulative material comprises fire brick.

18. A grate positioning assembly for a wood burning grill, the wood burning grill comprising a cabinet defining a coal support platform and a grate positioned above the coal support platform, the grate positioning assembly comprising:
   a drive arm that is rotatably coupled to the cabinet and the grate;
   a drive gear that is mechanically coupled to the drive arm such that rotating the drive gear rotates the drive arm to move the grate between a raised position and a lowered position;
   a support arm that is rotatably mounted to the cabinet and the grate for maintaining the grate in a substantially horizontal orientation while moving between the raised position and the lowered position;
   a hand wheel that is rotatably mounted to the cabinet;
   a rotating shaft that extends between the hand wheel and the drive gear; and
   a worm gear that mechanically couples the rotating shaft to the drive gear such that rotating the hand wheel rotates the drive gear to raise and lower the grate wherein the worm gear is configured to be self-locking such that the worm gear and drive gear only rotate when the hand wheel is rotated.

19. A wood burning grill defining a vertical direction, a lateral direction, and a transverse direction, the wood burning grill comprising:
   a cabinet defining a coal support platform for supporting burning wood during a grilling process;
   a grate positioned above the coal support platform along the vertical direction and defining a cooking surface for receiving food items;
   a firebox positioned adjacent the coal support platform, the firebox being configured for receiving wood for burning to form cooking coals; and
   a grate positioning assembly mechanically coupling the grate to the cabinet, the grate positioning assembly comprising:
      a linkage arm system mechanically coupling the grate to the cabinet; and
      a drive gear mechanically coupled to the linkage arm system and being rotatable to move the grate between a raised position and a lowered position.

20. The wood burning grill of claim 19, wherein the grate positioning assembly further comprises:
   a resilient element mechanically coupled to the drive gear and being configured to bias the drive gear toward the raised position.

* * * * *